United States Patent
Litkouhi

(10) Patent No.: US 7,388,475 B2
(45) Date of Patent: Jun. 17, 2008

(54) LANE DEPARTURE WARNING AND AVOIDANCE SYSTEM WITH WARNING MODIFICATION CRITERIA

(75) Inventor: Bakhtiar Brian Litkouhi, Washington, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 340 days.

(21) Appl. No.: 11/335,291

(22) Filed: Jan. 19, 2006

(65) Prior Publication Data

US 2007/0164852 A1  Jul. 19, 2007

(51) Int. Cl.
*G60Q 1/00* (2006.01)
*G06F 17/10* (2006.01)
*G06K 9/48* (2006.01)

(52) U.S. Cl. ............... 340/435; 340/425.5; 340/436; 340/438; 701/301; 382/199

(58) Field of Classification Search .......... 340/435, 340/436, 438, 425.5, 426.24, 903, 907, 933, 340/937; 701/300, 301, 70, 117; 382/104, 382/199; 348/113, 118, 148
See application file for complete search history.

(56) References Cited

U.S. PATENT DOCUMENTS

| | | | |
|---|---|---|---|
| 6,038,496 A * | 3/2000 | Dobler et al. ............... 701/3 |
| 6,449,383 B1 * | 9/2002 | Oike et al. ............... 382/104 |
| 6,748,302 B2 * | 6/2004 | Kawazoe ............... 701/1 |
| 7,091,838 B2 * | 8/2006 | Shimakage ............... 340/436 |
| 7,209,832 B2 * | 4/2007 | Yamamoto et al. ......... 701/301 |
| 7,218,207 B2 * | 5/2007 | Iwano ............... 340/435 |

* cited by examiner

Primary Examiner—Toan N. Pham

(57) ABSTRACT

A lane departure detection/avoidance and data fusion system adapted for use with a vehicle and by an operator, includes at least one lane-marking sensor, at least one condition sensor, and a controller communicatively coupled to the sensors, and configured to determine a condition deviation, and compare the condition deviation to a pre-determined condition threshold, so as to improve system identification of operator engagement, lane departure detection upon curves, and detection of performance degradation.

25 Claims, 6 Drawing Sheets

LANE DEPARTURE WARNING AND AVOIDANCE SYSTEM WITH WARNING MODIFICATION CRITERIA

BACKGROUND OF THE INVENTION

1. Technical Field

The present invention relates to lane departure warning and avoidance systems, and, more particularly, to a lane departure warning and avoidance system configured to automatically reduce or suppress the warning threshold, or otherwise modify the warning algorithm, at predefined conditions.

2. Background Art

Lane departure warning and avoidance (LDW) systems have been developed to aid the orderly navigation of thoroughfares by vehicle operators. More particularly, safety systems assist operators in maintaining proper lane alignment by alerting the operator to a possible un-intentional lane departure. Unlike, scarifications commonly found on thoroughfare shoulders that alert the operator of an at least partially completed lane departure, LDW systems provide timely warnings prior to lane departure. These LDW systems typically utilize at least one camera/image processor or other type of sensor (e.g., IR) to detect the lane markings that delineate the lane boundaries. Other lateral support systems, such as lane keeping (LK) systems, have similarly been developed.

One of the factors used for robust lane marking identification is the preview length of the lane markings ahead of the vehicle. Due to the curvature of some thoroughfare curves, however, the cameras of these systems are often unable to view the approaching lane marking for a sufficient period (mainly due to limited camera field of view (FOV)). Thus, the lane sensing capability of these conventional systems deteriorate directly proportional to the radius of curvature. As a result, the LDW system may have difficulties in providing timely warnings on sharp curves, especially at high speeds.

Of further concern, these conventional systems do not provide means for detecting purposeful lane departures, and therefore, often result in false or annoyance alarms that may distract the operator during an intricate maneuver. In other words, these systems are unable to discern whether the operator is currently in control of the vehicle, and intends to leave the lane. Finally, these systems also do not provide for calibration means, or performance measuring. As such, these systems may further provide false (annoyance) alarms and missed detections due to the natural performance degradation of the image processor and/or camera.

DISCLOSURE OF INVENTION

Responsive to these and other concerns, the present invention concerns an improved lane departure warning and avoidance system that utilizes data fusion to improve alert timing on curved thoroughfares, operator control detection, and performance measuring. Among other things, the novel system is useful for reducing the likelihood of producing false (annoyance) alarms and missed detections.

A first aspect of the present invention concerns a lateral support and data fusion system adapted for use with a vehicle and by an operator. The system includes at least one lane sensor configured to detect the position of the vehicle relative to at least one lane marking. At least one corroborating sensor is configured to determine at least one actual condition of the vehicle. Finally, the system includes a controller configured to determine the distance (or time to lane crossing) between the vehicle and said at least one lane marking, and alert the operator when the distance or time to lane crossing is less than a predetermined warning threshold. The inventive controller is further configured to compare the actual condition to a predetermined estimated condition, so as to determine a condition deviation, and reduce the warning threshold, when the condition deviation is greater than a pre-determined tolerance factor.

A second aspect of the present invention concerns a lateral support and data fusion system adapted for use with a vehicle, and by an operator. In this aspect, the inventive controller is configured to compare the actual condition to a predetermined engaged condition threshold, and suppress the warning threshold, when the actual condition does not comply with the operator engaged condition threshold.

Finally, a third aspect of the present invention concerns a lateral support and data fusion system that further includes an image processor, and at least one camera. In this aspect, the inventive controller is configured to compare the actual condition to a predetermined calibration condition threshold, and adjust the lane-marking sensor or warning algorithm, when the actual condition does not comply with the calibration condition threshold.

It will be understood and appreciated that the present invention provides a number of advantages over the prior art, including, for example, providing a more reliable lane detection system. The preferred system is further configured to provide redundant data feedback from multiple condition sensors, so as to present a self-calibration and performance measuring closed loop system.

Other aspects and advantages of the present invention will be apparent from the following detailed description of the preferred embodiment(s) and the accompanying drawing figures.

BRIEF DESCRIPTION OF DRAWINGS

Preferred embodiment(s) of the invention are described in detail below with reference to the attached drawing figures, wherein.

DETAILED DESCRIPTION OF PREFERRED EMBODIMENTS OF THE INVENTION

Figure 1:
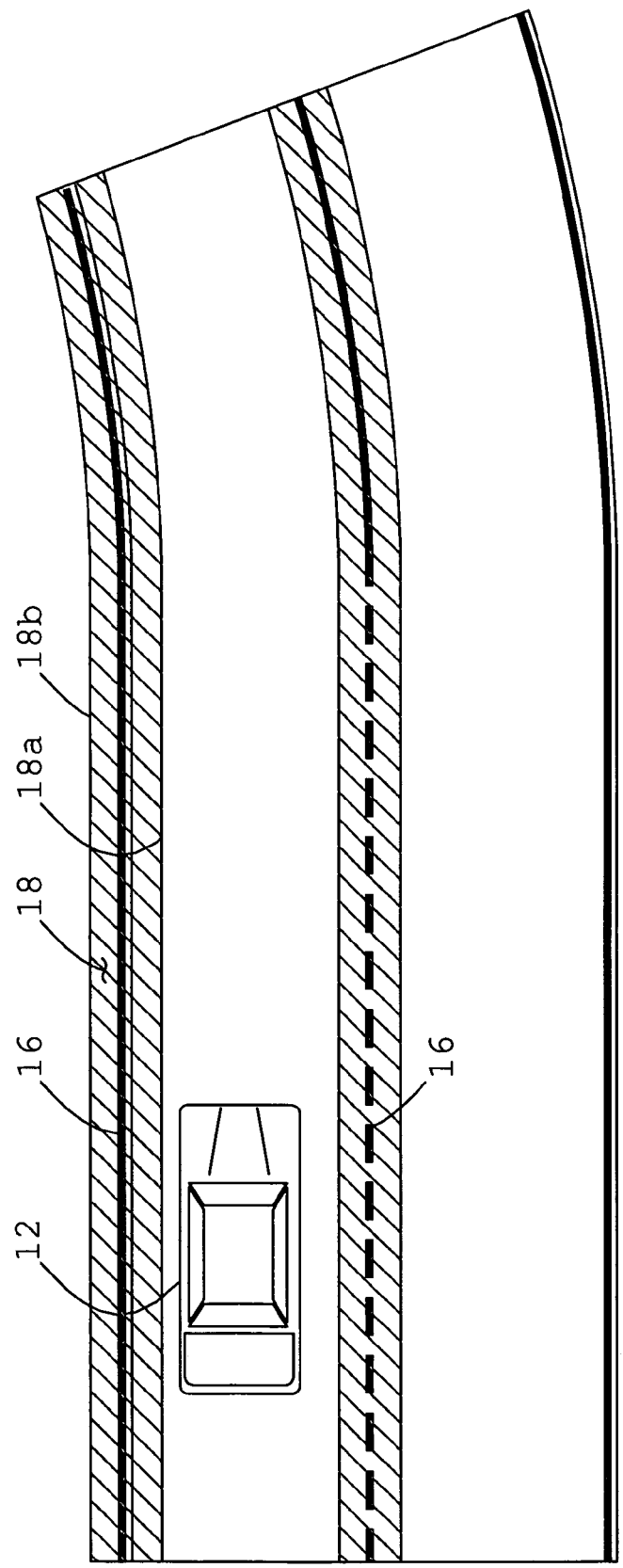
FIG. 1 is a plan view of the vehicle traveling upon a thoroughfare having an approaching curve, particularly illustrating curved lane markings.

The present invention concerns an improved lane departure warning and avoidance system 10 adapted for use with a vehicle 12 and by an operator 14. The system 10 is described and illustrated herein with respect to automobiles, however, it is certainly within the ambit of the present invention to utilize the system 10 with other lane-based human or autonomously operated transportation machines. As shown in FIG. 1, the system 10 is configured to detect the position of the vehicle 12, and at least one lane marking 16 that delineates the lane boundary of a lane, wherein the term lane marking may include highly reflective paint or thermoplastic stripes (whether in continuous or dashed line-type), curbs, medians, reflectors, and otherwise distinguishable edges of pavement.

Where the distance between the lane marking 16 and vehicle 12 (as measured from the sensor position) is less than a predetermined warning threshold, the system 10 is configured to alert the operator 14 to a possible un-intentional lane departure. More preferably, the system 10 is configured to deactivate the warning, once the vehicle 12 has completed the lane departure, so as to present a warning zone 18 defined by earliest and latest warning lines 18a,b (see, FIG. 1). The system 10 is further configured to determine an actual vehicle condition, compare the actual condition to a predetermined estimated condition to determine a condition deviation, and further compare the condition deviation to a condition threshold. Where the condition deviation does not comply with the condition threshold, the system 10 is configured to reduce or suppress the warning threshold, or otherwise modify the system 10.

Figure 2:
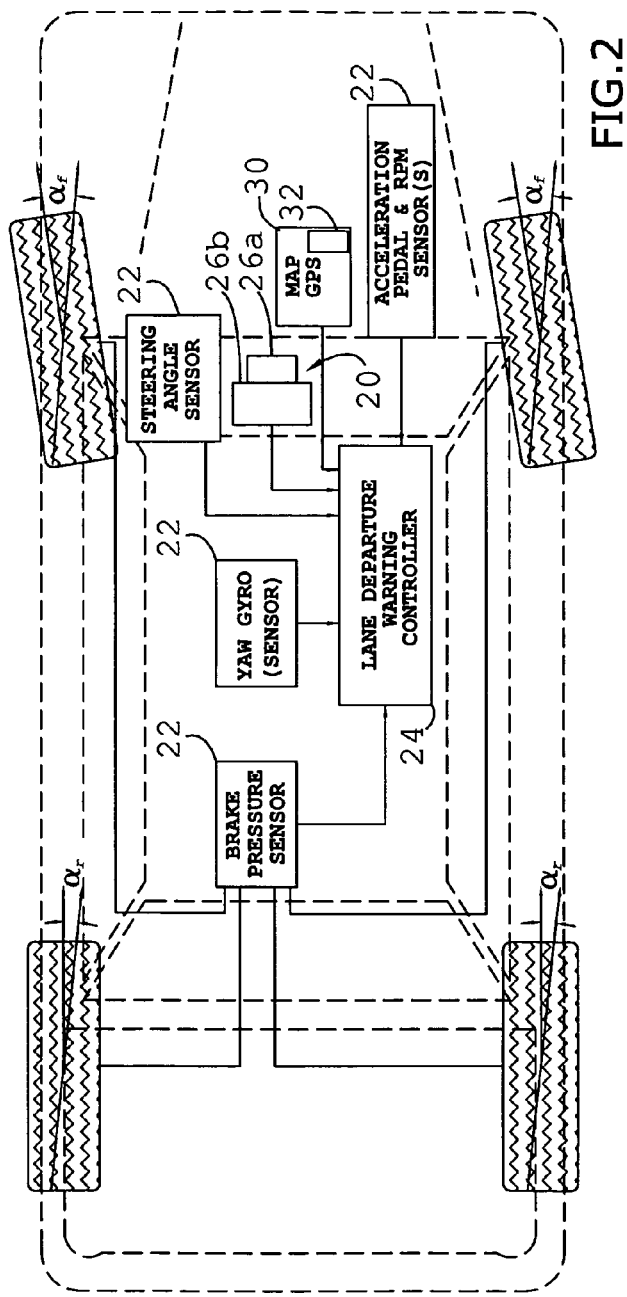
FIG. 2 is a plan view of a vehicle in accordance with the present invention, particularly illustrating components of a preferred lane departure warning and avoidance system.

Thus, in general, the system 10 utilizes data fusion to improve a functional aspect of the system 10. In the preferred embodiments described and illustrated herein, data fusion is utilized to improve I) identification of operator engagement, II) lane marking detection and alert timing upon curves, and III) detection of performance degradation. As shown in FIG. 2, a preferred embodiment of the system 10 includes at least one lane-marking sensor 20, at least one condition sensor 22, and a controller 24 communicatively coupled to both sensors 20,22. It is within the ambit of the invention, however, to combine two or more of these components, so as to present an integral unit. It is also within the ambit of the invention to perform the functions of at least one of these components at a remote location, and by a third party (not shown) communicatively coupled to the controller 24.

I. Identification of Operator Engagement

As best shown in FIG. 2, the preferred lane-marking sensor 20 preferably includes at least one camera 26a, and a video image processor 26b that are cooperatively configured to photo-electrically capture a periodic or continuous video feed as the vehicle 12 travels upon the thoroughfare, convert the video images into a periodic or continuous data stream, and deliver the data stream to the controller 24. The camera(s) 26a is oriented so as to capture both left and right lane extremities delineated by the lane markings 16 for a sufficient distance upstream. The preferred processor 26b is further configured to determine the lateral velocity of the vehicle 12 with respect to the lane markings 16 (V_yl), and an "on" or "off" warning flag value depending upon the distance between the vehicle 12 and lane markings 16, and/or lateral velocity vector. Finally, a suitable lane-marking sensor 20 for use with the present invention may include a charged-coupled device (CCD) or complementary metal oxide semi-conductor (CMOS) image sensor, where it is appreciated that a CMOS imaging sensor has less components and therefore requires less power than a CCD. Alternatively, the lane-marking sensor 20 may include other suitable lane-detection devices, such as an infrared (IR) sensor (see, FIG. 4).

Each condition sensor 22 is configured to sense a condition of the vehicle 12, and more preferably, at least one condition selected from the group consisting of, but not limited to, the location of the vehicle, the application of a brake secondary switch (where applicable), the hydraulic brake pressure (B), the steering angle (δ), the acceleration pedal travel or force or (A), the engine revolutions per minute (rpm), the absolute lateral acceleration (LA), the speed (V), the yaw rate, turn signal actuation, a manual gear shift, the suspension displacement, and the displacement due to heaving. Most preferably, the system 10 includes a plurality of condition sensors 22 configured to determine each of the aforementioned conditions, so as to provide redundancy. Each condition sensor 22 is further configured to periodically or continuously deliver condition data to the controller 24 as the vehicle 12 travels upon the thoroughfare. Where a plurality of conditions is determined, the controller 24 is more preferably configured to corroboratively utilize each in determining operator engagement. That is to say, where one condition threshold is met, the preferred controller 24 is configured to further consider other related condition sensors, so as to confirm engagement. For example, where an engaged steering angle threshold is met, the turn signal actuation sensor is preferably also considered to corroborate operator engagement.

Figure 3:
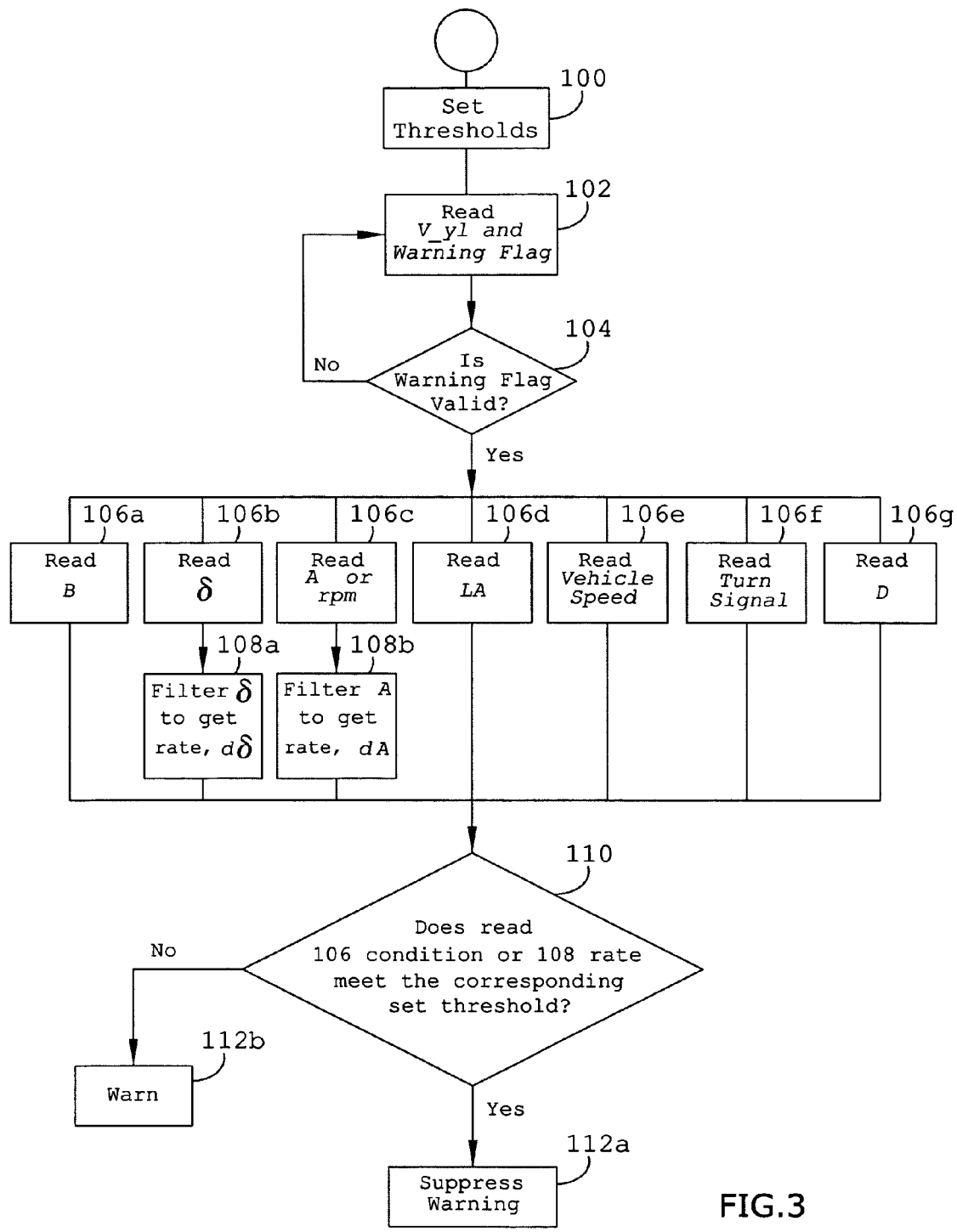
FIG. 3 is a flow chart of a preferred embodiment of the control algorithm with respect to operator engagement detection.

As shown in FIG. 3, a preferred method of identifying operator engagement begins at a first step 100, where an engagement threshold is set for each condition sensor 22. More specifically, the controller 24 is configured to generate an output, when a pre-determined condition value normally associated with operator engagement is achieved. For example, a steering angle offset greater than normal misalignment (e.g., 20°–30°) may be set as the steering angle threshold. At step 102, the controller 24 typically reads the lateral velocity with respect to the lane markings (V_yl), to determine an "on" warning flag value, where a non-compliant vehicle/lane marking relationship is detected. In this configuration, the warning flag results from the determination of a non-compliant distance or time to lane crossing as detected by the lane-marking sensor 20. However, where alternative warning flag detection is presented, it is appreciated that V_yl may be determined as a control condition variable at step 106 further described below. At a step 104, the "on" value for the warning flag condition is verified through repetitive means. If a false flag is found, then the method returns to step 102 as the vehicle 12 travels along the thoroughfare.

However, if the warning flag is valid, and at parallel steps 106a-g, the controller 24 is configured to read condition values from at least a portion of the condition and lane detection sensors 20,22. In this configuration, it is appreciated that the verification period at step 104 must be less than a pre-determined maximum functional period, so as to enable a useful comparison of a valid flag and the conditions at steps 106a-g. The sensors 20,22 are preferably connected in parallel, so that only a portion needs to be read to complete a loop. At an optional step 108, the preferred controller 24 is further configured to filter at least one condition to determine a rate of change condition therefor. For example, as shown in FIGS. 3, 3a, and 3b, the steering angle and acceleration pedal travel or force conditions can be filtered, at parallel steps 108a,b, to determine a rate of steering angle change condition (dδ) and a rate of acceleration pedal travel or force change condition (dA).

Next, at step 110, at least a portion of the conditions received are compared to pre-determined corresponding engaged condition thresholds. If for at least one condition, the engaged condition threshold is met, thereby indicating operator engagement, the method proceeds to a step 112a, where the warning flag is suppressed. It is appreciated that where the engaged lateral acceleration threshold (either absolute or with respect to the lane markings) is met, the operator is most likely undertaking an evasive maneuver. In this instance, the preferred controller 24 is further configured to immediately proceed to step 112a without considering other sensory data. More preferably, the controller 24 is configured to immediately proceed to step 112a when any of the conditions exceed their corresponding threshold. Where an engaged condition threshold is not met, the warning is produced at a step 112b. The cycle repeats itself, by returning to step 102, until the system 10 is de-activated.

Figure 3A:
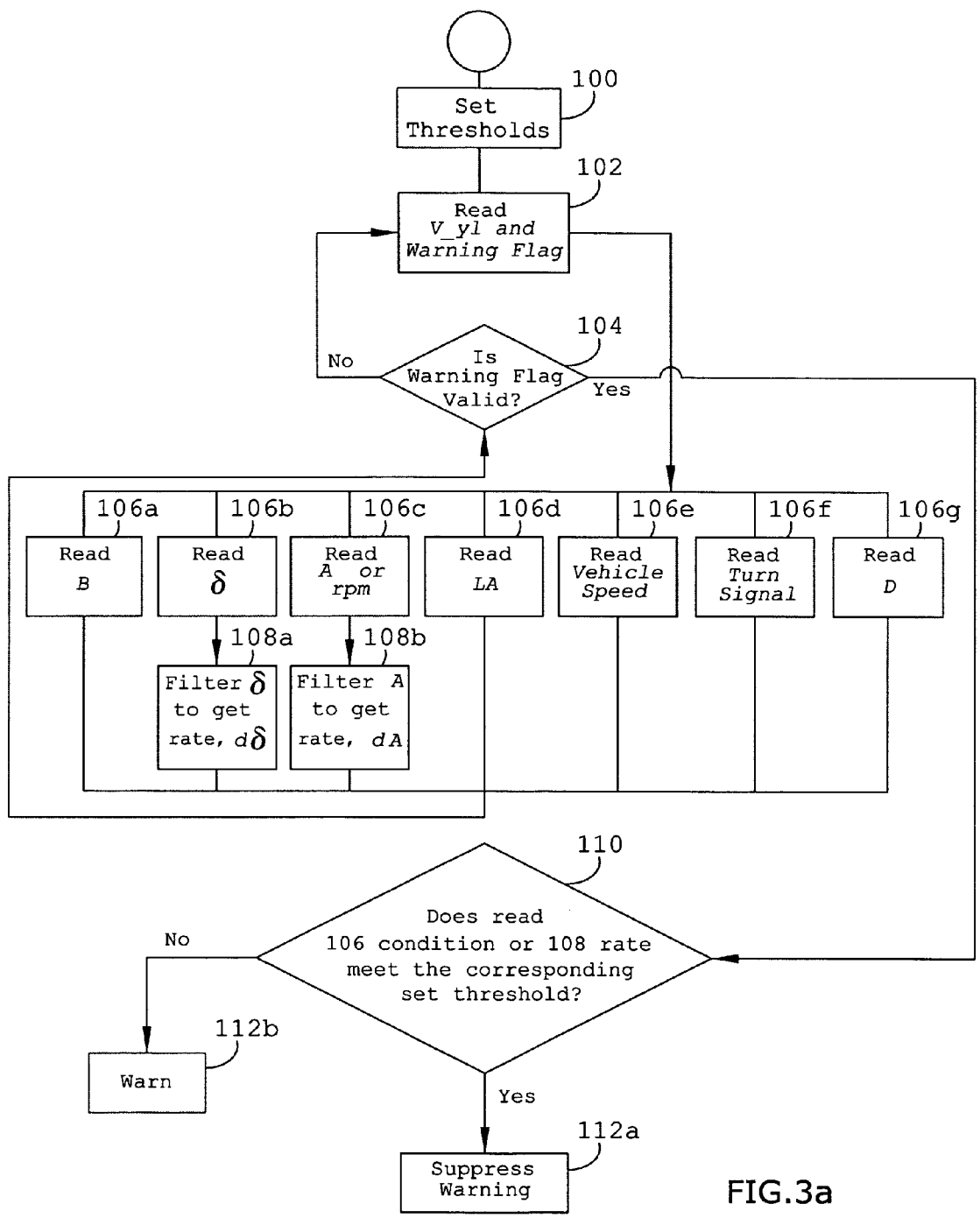
FIG. 3a is an alternative embodiment of FIG. 3, wherein the condition assessment steps are rescheduled so as to precede the warning flag verification step.
Figure 3B:
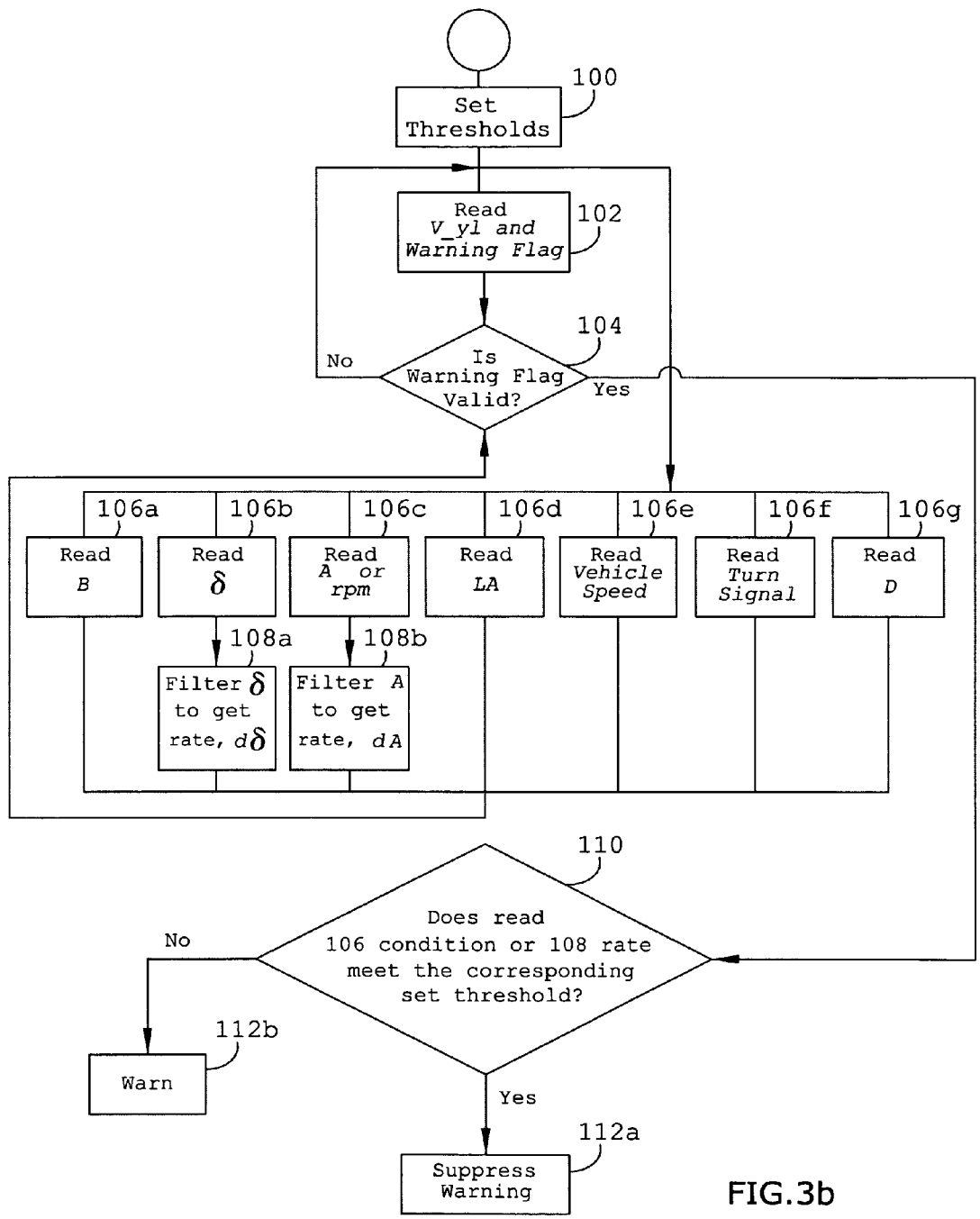
FIG. 3b is a second alternative embodiment of FIG. 3, wherein the condition assessment steps are rescheduled so as to precede the warning flag verification step, and the flag generation/assessment and condition assessment steps are performed concurrently.

In an alternative configuration shown in FIG. 3a, steps 106a-g and 108a,b are rescheduled to precede warning flag verification at step 104. This configuration, it is appreciated, provides a more accurate assessment of the conditions present at the time of warning flag generation. Where a false flag is determined at rescheduled step 104, it is also appreciated, however, that the prior read conditions must be erased from memory prior to returning to step 102. Finally, in a third alternative shown in FIG. 3b, step 102 and rescheduled steps 106a-g and 108a,b may present parallel steps preceding warning flag verification at step 104, so that condition assessment is performed concurrently with warning flag generations. In this second alternative configuration, the warning flag verification step 104 is necessarily configured to determine valid, false, as well as null flag scenarios.

II. Lane Departure Detection and Alert Timing Enhancement upon Curves

As previously mentioned, a second functional improvement resulting from data fusion concerns lane departure detection enhancement upon curves. In this configuration, the lane marking and/or condition sensor(s) 20,22 provide to the controller 24 curvature radius data (R), as preferably measured from the longitudinal lane centerline. The preferred controller 24 utilizes the radius data to determine an estimated steering angle ($\delta_R$), and compares $\delta_R$ to the actual steering angle (δ) to further determine a steering wheel angle condition deviation. Where the steering wheel condition deviation is outside of the tolerance range for a given curve, the controller 24 acts to reduce the warning threshold by a predetermined value, so as to effect timely warning to the operator 14.

More particularly, the preferred condition sensor(s) 20 includes a locator device 28 and, more preferably, a map database 30 consisting of a plurality of position points. The preferred locator device 28 is configured to determine the actual location of the vehicle upon a three-dimensional coordinate system, and correlate the coordinates with one of said plurality of map position points. More preferably, the database 30 includes a plurality of maps built from GPS data of actual geographic roadways and thoroughfares. At least a portion of the points preferably include ID links that enable correlation between a given point and indicia data corresponding to an actual condition at the corresponding location. In the present invention, the indicia preferably includes the curvature radius of the road at the given point, and can be determined from engineering design data or by curvature analysis methodology. Finally, the database 30 may be stored in the system 10 by conventional storage means, such as a DVD-ROM, internal hard disk, or removable memory card.

Figure 4:
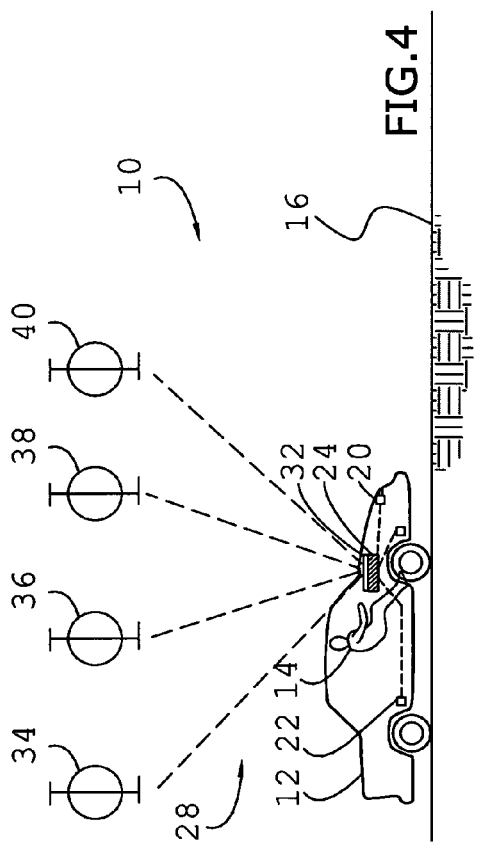
FIG. 4 is an elevation view of a navigation system, vehicle and operator in accordance with a preferred embodiment of the present invention.

As shown in FIGS. 2 and 4, the preferred locator device 28 determines the longitude, latitude and elevation coordinates of the vehicle utilizing a GPS receiver 32 positioned within the vehicle 12, and four mapped satellites 34,36,38,40 communicatively coupled to the receiver 32. Alternatively, other signal sources located at control points could be communicatively coupled to the receiver 32, and other coordinate systems based on a variety of geodetic datum, units, projections, and references could be utilized. Finally, where a GPS/map database is not provided, the image processor 26b, or other sensory data such as yaw rate, and lateral acceleration, may be utilized to estimate the radius of curvature for a given point.

Figure 5:
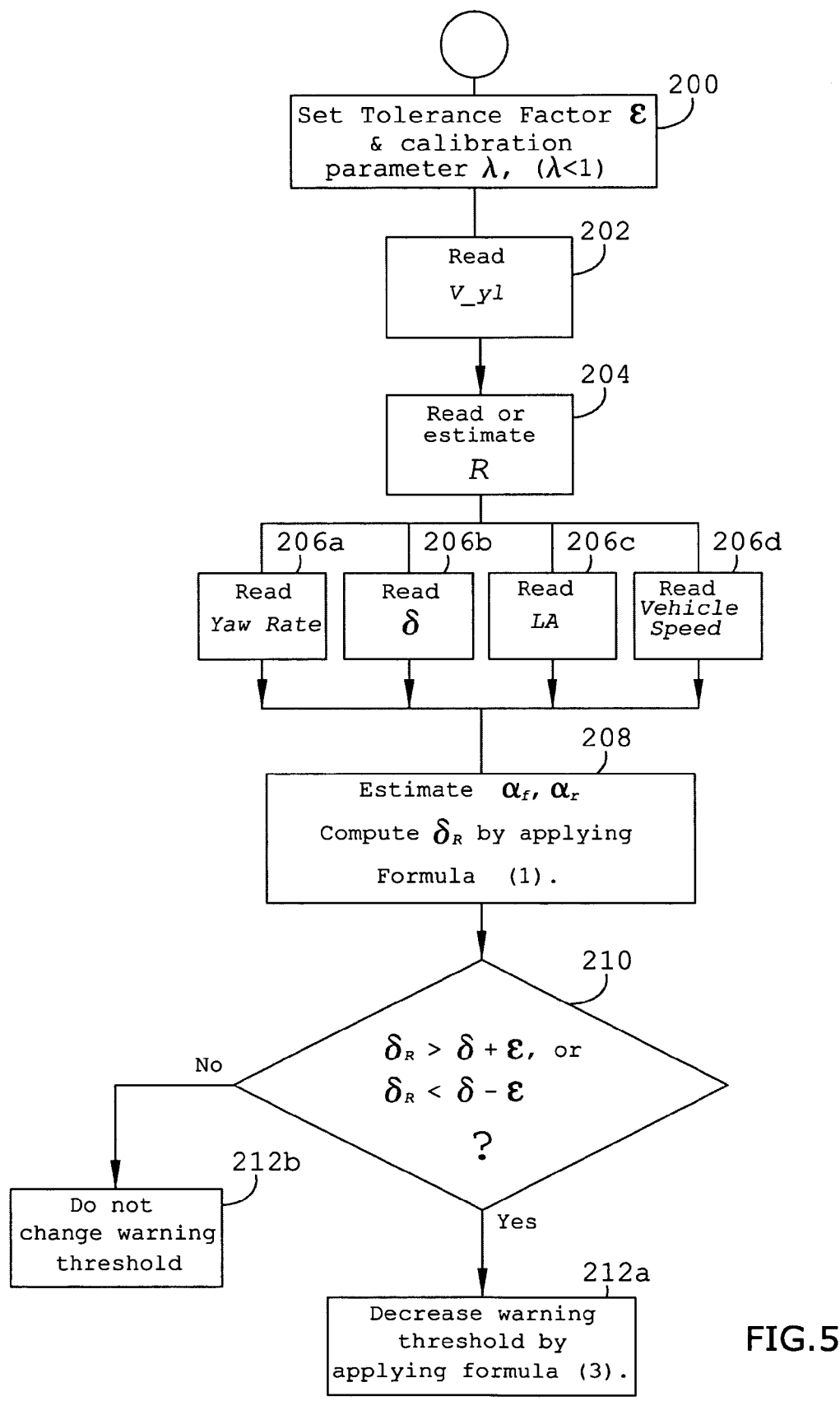
FIG. 5 is a flow chart of a preferred embodiment of the control algorithm with respect to lane departure detection upon a curve.

As shown in FIG. 5, a preferred method of lane departure detection upon a curve based on the steering wheel angle begins at a step 200 by setting a steering wheel angle tolerance factor (ε) that cooperatively defines an acceptable steering wheel range for navigating the curve equal to $\delta_R+\epsilon$, and a calibration factor (λ), wherein λ is less than 1. At a step 202, V_yl is read from the image processor 26b, and at a step 204 R is determined in part by the map database 30 or estimated in part by the image processor 26b. At preferably parallel steps 206a-d, δ, V, yaw rate, and LA are read from condition sensors 22.

Next, at step 208, the controller 24 is preferably configured to estimate side slip angles for the front axle wheels ($\alpha_f$), and for the rear axle wheels ($\alpha_r$), wherein the side slip angle is the angular difference between the direction of the longitudinal axis of the wheel and the wheel itself (see, FIG. 2). More particularly, the controller 24 may be configured to estimate the side slip angles based on the wheel speeds, lateral acceleration, and actual or estimated yaw rates of the vehicle 12. From the estimated side slip angles, $\delta_R$ is preferably determined as a function of the steering gear ratio (G) and wheel base (L) of the vehicle 12, along with R, $\alpha_f$, and $\alpha_r$; and, more preferably, according to the formula:

$$\delta_R = G[(C_1/R)+(\alpha_f-\alpha_r)], \text{ where } C_1=(180/\pi)L \quad (1).$$

It is appreciated, however, that where an accurate estimate of $\alpha_f$ or $\alpha_r$ does not exist, the difference in side slip angle can be omitted from Equation (1) and the $\delta_R$ is evaluated accordingly.

As previously mentioned, once $\delta_R$ is determined and at a step 210, it is compared to a pre-determined tolerance range, according to the following inequality:

$$|\delta_R - \delta| > \epsilon \quad (2)$$

Where a condition deviation is met by a true value for the inequality, and at a step 212a the preferred controller 24 is configured to reduce the warning threshold according to the formula:

$$\lambda(\epsilon/|\delta_R - \delta|) \quad (3),$$

so that as the vehicle 12 drifts off of the curve, the warning threshold is reduced and the warning is delivered to the operator 14 at a faster rate. Where the condition deviation is within tolerance, and at a step 212b, the warning threshold is not changed. Again, the cycle repeats itself by returning to step 202, until the system 10 is deactivated. In the preferred embodiment described herein, it is appreciated that ε and λ are generally inversely proportional to vehicle longitudinal velocity. It is also appreciated that instead of using a singular factor, such as λ, a more complex function of $\epsilon/|\delta_R-\delta|$ can be utilized in the threshold reduction algorithm.

III. Detection of Performance Degradation

A novel aspect of the present invention is the use of data fusion to calibrate and measure the performance of the system 10. To that end, the preferred system 10 is further configured to utilize data received from condition sensor(s) 22 as feedback under a control loop. For example, where a possible un-intentional lane departure is detected, and the warning flag value is "on," the preferred controller 24 may be configured to determine at least one condition deviation, such as the steering angle comparison discussed in part (II). It is appreciated that where the steering wheel angle condition deviation is within tolerance but the warning flag is "on," possible performance degradation of the image processor 26b may exist. It is further appreciated that providing feedback under a control loop, provides significant improvements to the system by reducing the likelihood of false alarms and missed detections due to natural degradation.

Other sensory measurements, such as heave and suspension displacement, may also be utilized to determine instantaneous performance interference. That is to say, the preferred controller 24 is further configured to consider the effects of heave and suspension displacement when determining vehicle positioning with respect to lane markings. The warning flag is suppressed, where these effects result in a false alarm. It is appreciated by those ordinarily skilled in the art that the use of suspension displacement (e.g. from MR shocks) provides a reliable and fast (apprx. 50 Hz) measure of image disturbance for suppressing the warning flag. It is also appreciated that the image processor 26b may itself be utilized to determine the pitch or vertical displacement of the camera 26a, and suppress the warning flag, if more than a preset threshold is realized. Finally, the preferred controller 24 and sensors 20,22 are also configured to utilize the constant feedback to modify the threshold and parameter values of the warning algorithm, so as to present a self-calibrating system.

Another usage of condition sensor data is to activate and deactivate the system 10 without interfering with the control of the vehicle by the operator 14. For example, a manual gear shift condition sensor and controller 24 can be cooperatively configured to suppress the warning upon a manual gear shift by the operator 14, and/or to deactivate the system when the gear shift (not shown) is shifted to park, so as to reduce the idle battery load. The system 10 may also be configured to operate upon demand either through visual, audio or haptic means (such as a vibrating seat or the accelerator pedal force condition). For example, a voice request/voice response or button press/voice response mechanism (also not shown) may be actuated by the operator 14, when lane departure detection is desired.

The preferred forms of the invention described above are to be used as illustration only, and should not be utilized in a limiting sense in interpreting the scope of the present invention. Obvious modifications to the exemplary embodiments and methods of operation, as set forth herein, could be readily made by those skilled in the art without departing from the spirit of the present invention. The inventor hereby states his intent to rely on the Doctrine of Equivalents to determine and assess the reasonably fair scope of the present invention as pertains to any system or method not materially departing from but outside the literal scope of the invention as set forth in the following claims.

What is claimed is:

1. A lane departure detection and data fusion system adapted for use by an operator and with a vehicle traveling upon a thoroughfare, said system comprising:
   at least one lane-marking sensor configured to detect the position of the vehicle relative to at least one lane marking;
   at least one condition sensor configured to determine at least one actual condition of the vehicle; and
   a controller communicatively coupled to the lane marking and condition sensors, and configured to determine the distance or time to lane crossing between the vehicle and said at least one lane marking, alert the operator when the distance is less than a predetermined warning threshold, compare the actual condition to a predetermined estimated condition, so as to determine a condition deviation, and reduce the warning threshold, when the condition deviation is greater than a predetermined tolerance factor ($\epsilon$).

2. The system as claimed in claim 1,
   said controller being further configured to determine a time to lane crossing by the vehicle, and alert the operator when the time to lane crossing is less than a predetermined warning threshold.

3. The system as claimed in claim 1; and
   a map database presenting a plurality of position points;
   a locator device communicatively coupled to the database, and configured to determine the location of the vehicle and match the location with a first of said position points,
   said controller being further configured to compare the actual condition to a predetermined estimated condition relative to the location of the vehicle.

4. The system as claimed in claim 1,
   said vehicle including a steering wheel,
   said at least one condition sensor being configured to detect the actual steering wheel angle ($\delta$),
   said controller being further configured to compare $\delta$ to a predetermined estimated steering angle ($\delta_R$) based on the location of the vehicle.

5. The system as claimed in claim 4,
   said controller being further configured to reduce the threshold by a pre-determined value, wherein said value is a function of $\delta_R$, $\delta$, and a calibration parameter ($\lambda$).

6. The system as claimed in claim 5,
   said controller being further configured to reduce the threshold by the formula:

$\lambda(\epsilon|\delta_R-\delta|)$.

7. The system as claimed in claim 4,
   said vehicle presenting a steering gear ratio (G), a wheel base length (L), and side slip angles for the front axle ($\alpha_f$), and for the rear axle ($\alpha_r$),
   said lane-marking sensor, condition sensor, and controller being cooperatively configured to determine a current radius of curvature (R) for the thoroughfare,
   said estimated steering wheel angle ($\delta_R$) being determined as a function of G, R, $\alpha_f$, $\alpha_r$, and L.

8. The system as claimed in claim 7,
   said estimated steering angle being determined according to the formula $\delta_R = G[(C_1/R)+(\alpha_f-\alpha_r)]$, where $C_1=(180/\pi)L$.

9. The system as claimed in claim 1,
   said at least one condition sensor being configured to detect an actual brake condition, said controller being further configured to compare the actual brake condition to a predetermined engaged brake condition threshold, and suppress the warning threshold, when the actual condition does not comply with the condition threshold.

10. The system as claimed in claim 1,
said at least one condition sensor being configured to detect an actual steering angle,
said controller being further configured to determine a rate of steering angle change, compare the rate of steering angle change to a predetermined threshold, and suppress the warning threshold, when the actual condition does not comply with the condition threshold.

11. The system as claimed in claim 1,
said at least one condition sensor being configured to detect an actual acceleration pedal travel or force or engine rpm condition,
said controller being further configured to determine a rate of acceleration pedal force or travel or engine rpm condition change, compare the rate of acceleration pedal travel or force or engine rpm condition change to a predetermined threshold, and suppress the warning threshold, when the acceleration pedal travel or force or engine rpm change condition does not comply with the condition threshold.

12. The system as claimed in claim 1,
said vehicle including a steering wheel,
said at least one condition sensor being configured to detect the angle of the steering wheel, and the actuation condition of a corresponding turn signal,
said controller being further configured to compare the steering wheel angle and turn signal actuation conditions to corresponding predetermined condition thresholds, and suppress the warning threshold, when the actual conditions do not comply with the condition thresholds.

13. The system as claimed in claim 1,
said at least one condition sensor being configured to detect the suspension displacement of the vehicle,
said controller being further configured to compare the suspension displacement to a predetermined suspension displacement threshold, and suppress the warning threshold, when the displacement does not comply with the displacement threshold.

14. The system as claimed in claim 1,
said vehicle having a gear shift,
said at least one condition sensor being configured to detect a manual shift of the gear shift,
said controller being further configured to suppress the warning threshold upon the occurrence of a manual shift of the gear shift.

15. The system as claimed in claim 1,
said at least one condition sensor being configured to detect the absolute lateral acceleration of the vehicle,
said controller being further configured to compare the absolute lateral acceleration to a predetermined lateral acceleration threshold, and suppress the warning threshold, when the absolute lateral acceleration does not comply with the predetermined threshold.

16. The system as claimed in claim 15,
said at least one condition sensor being configured to detect the lateral velocity with respect to said at least one lane marking,
said controller being further configured to compare the lateral velocity with respect to said at least one lane marking to a predetermined lateral velocity with respect to said at least one lane marking threshold, and suppress the warning threshold, when the lateral velocity with respect to said at least one lane marking does not comply with the condition threshold.

17. The system as claimed in claim 1,
said at least one lane-marking sensor, at least one condition sensor, or controller being spaced from the vehicle, and controlled by a third party.

18. A lane deviation detection system adapted for use with a vehicle, said system comprising:
at least one lane-marking sensor configured to detect the position of the vehicle relative to at least one lane marking, and including an image processor and at least one camera;
at least one condition sensor configured to determine at least one actual condition of the vehicle; and
a controller communicatively coupled to the lane-marking and condition sensors, presenting a warning algorithm, and configured to determine the distance between the vehicle and said at least one lane marking, alert the operator when the distance is less than a predetermined warning threshold, compare the actual condition to a predetermined calibration condition threshold, and adjust the warning algorithm, when the actual condition does not comply with the condition threshold.

19. The system as claimed in claim 18,
said image processor being configured to determine a pitch or vertical displacement condition for said at least one camera,
said controller being further configured to suppress the warning threshold if the pitch or vertical displacement is greater than a predetermined camera threshold.

20. The system as claimed in claim 18,
said controller being further configured to adjust the lane-marking sensor, when the actual condition does not comply with the condition threshold.

21. A computer program for execution by at least one electronic device associated with a vehicle traveling upon a thoroughfare, wherein said vehicle has an operator, at least one lane-marking sensor, and at least one condition sensor, and said program is configured to receive lane marking and condition data from the sensors, determine the distance between the vehicle and said at least one lane marking, generate an electric warning flag so as to alert the operator when the distance or time to lane crossing is less than a predetermined warning threshold, compare the condition data to a predetermined estimated condition threshold, and modify the warning threshold, based on the condition data and threshold comparison.

22. The program as claimed in claim 21, wherein the program is further configured to compare the condition data to a predetermined estimated condition threshold, so as to determine a condition deviation, and modify the warning threshold, when the condition deviation is greater than a pre-determined tolerance factor.

23. The program as claimed in claim 21, wherein the program is further configured to verify the warning flag prior to alerting the operator.

24. The program as claimed in claim 23, wherein the program is further configured to verify the warning flag after receiving the condition data.

25. The program as claimed in claim 24, wherein the warning flag is generated and the condition data is received concurrently.

* * * * *